(12) United States Patent
Uejima (10) Patent No.: US 9,467,198 B2
(45) Date of Patent: Oct. 11, 2016

(54) HIGH-FREQUENCY MODULE AND COMMUNICATION DEVICE

(71) Applicant: Murata Manufacturing Co., Ltd., Nagaokakyo-shi, Kyoto-fu (JP)

(72) Inventor: Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/819,482

(22) Filed: Aug. 6, 2015

(65) Prior Publication Data

US 2015/0341076 A1    Nov. 26, 2015

Related U.S. Application Data

(63) Continuation of application No. PCT/JP2014/052716, filed on Feb. 6, 2014.

(30) Foreign Application Priority Data

Feb. 12, 2013   (JP) ............................. 2013-024005

(51) Int. Cl.
*H04B 1/44* (2006.01)
*H04B 1/00* (2006.01)
(Continued)

(52) U.S. Cl.
CPC ............... *H04B 1/52* (2013.01); *H04B 1/006* (2013.01); *H04B 1/0057* (2013.01); *H04B 1/0064* (2013.01); *H04B 1/3805* (2013.01); *H04B 1/406* (2013.01)

(58) Field of Classification Search
CPC .... H04B 1/04; H04B 1/0475; H04B 1/0053; H04B 1/0057; H04B 1/006; H04B 1/18; H04B 1/38; H04B 1/40; H04B 1/44; H04B 1/48; H04B 1/50; H04B 1/406; H04B 1/525; H04B 15/00; H04M 1/6066; H01P 1/212
USPC ............. 455/63.1, 67.13, 78, 82, 83, 552.1, 455/553.1; 375/219; 327/415, 419
See application file for complete search history.

(56) References Cited

U.S. PATENT DOCUMENTS 6,928,298 B2 * 8/2005 Furutani ................ H03H 7/463
                                                    455/553.1
7,545,759 B2 * 6/2009 Hayashi .................... H01P 1/15
                                                    455/82

(Continued)

FOREIGN PATENT DOCUMENTS

CN      1977467 B       5/2010
JP      2003-152588 A   5/2003

(Continued)

OTHER PUBLICATIONS

Official Communication issued in International Patent Application No. PCT/JP2014/052716, mailed on May 13, 2014.

*Primary Examiner* — Quochien B Vuong
(74) *Attorney, Agent, or Firm* — Keating & Bennett, LLP (57) ABSTRACT

A high-frequency module is connected to a switch port and a switch IC including an antenna connection port and a plurality of switch ports. The high-frequency module includes a signal path that outputs transmitting signals having a predetermined frequency band to the switch IC, a module port connected to the signal path and to which a duplexer and a transmitter circuit are connected, and a harmonic branch circuit that is provided on the signal path and allows a harmonic of the transmitting signal to escape to ground.

20 Claims, 5 Drawing Sheets

(51) Int. Cl.
*H04B 1/52* (2015.01)
*H04B 1/3805* (2015.01)
*H04B 1/403* (2015.01)

(56) References Cited

U.S. PATENT DOCUMENTS

| | | | |
|---|---|---|---|
| 7,885,613 B2* | 2/2011 | Kemmochi | H04B 1/006 |
| | | | 455/78 |
| 8,891,596 B2* | 11/2014 | Hayafuji | H03H 7/40 |
| | | | 375/219 |
| 9,300,019 B2* | 3/2016 | Ono | H05K 1/0225 |
| 9,306,603 B2* | 4/2016 | Lee | H04B 1/0053 |
| 2004/0266378 A1 | 12/2004 | Fukamachi et al. | |
| 2008/0212552 A1 | 9/2008 | Fukamachi et al. | |
| 2012/0049945 A1 | 3/2012 | Meguro et al. | |

FOREIGN PATENT DOCUMENTS

| | | |
|---|---|---|
| JP | 2007-129459 A | 5/2007 |
| JP | 2009-124746 A | 6/2009 |
| WO | 2009/157283 A1 | 12/2009 |

\* cited by examiner

HIGH-FREQUENCY MODULE AND COMMUNICATION DEVICE

BACKGROUND OF THE INVENTION

1. Field of the Invention

The present invention relates to high-frequency modules provided in antenna front-ends of wireless communication devices such as cellular phones and to communication devices each including a high-frequency module and a receiver that is separately provided in addition to the high-frequency module.

2. Description of the Related Art

Figure 5:
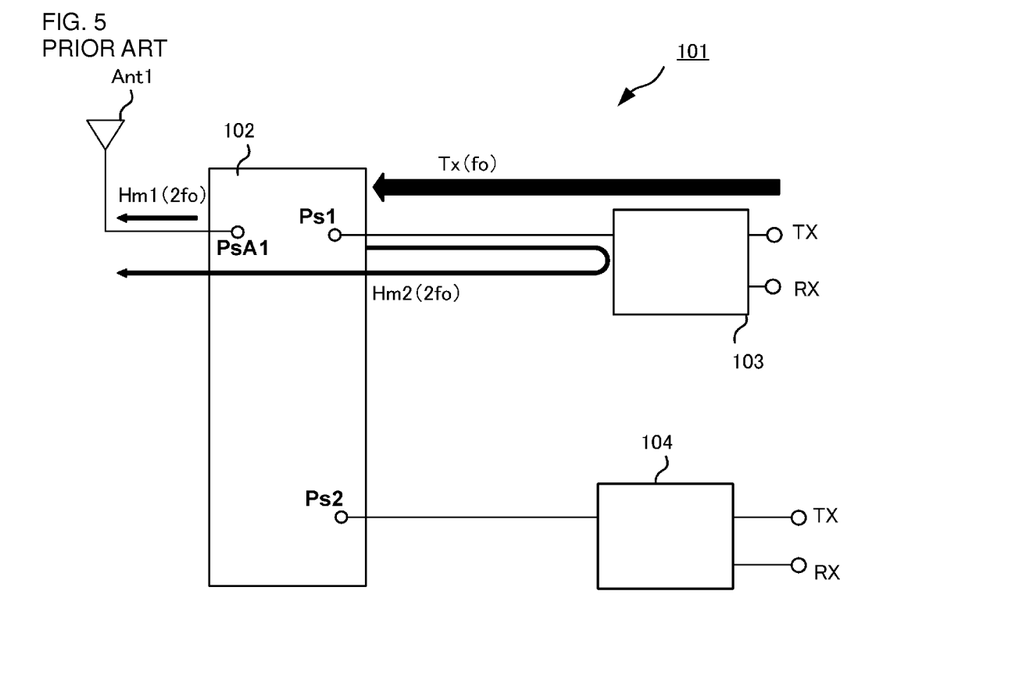
FIG. 5 is a schematic circuit diagram depicting a high-frequency module according to an exemplary prior art.

FIG. 5 is a circuit diagram of a high-frequency module according to an exemplary prior art (for example, see Japanese Unexamined Patent Application Publication No. 2007-129459) to be used in an antenna front-end of a cellular phone and the like. A high-frequency module 101 includes a switch IC 102, a duplexer 103, and a duplexer 104. The high-frequency module 101 has the capability of transmitting and receiving signals in a first communication band and a second communication band using a transmission/reception antenna Ant1. The switch IC 102 includes an antenna connection port PsA1 and two switch ports Ps1 and Ps2, and has the capability of switching connection between the antenna connection port and the switch port. The duplexer 103 is connected to the switch IC 102 via the switch port Ps1, and including a transmission filter and a reception filter for signals in the first communication band. The duplexer 104 is connected to the switch IC 102 via the switch port Ps2, and including a transmission filter and a reception filter for signals in the second communication band.

In this high-frequency module 101, inputting a transmitting signal in the first communication band or the second communication band causes the switch IC 102, the duplexer 103 or 104 to generate a second-order harmonic or a third-order harmonic of the transmitting signal, and these harmonic signals travel to the antenna Ant1.

For example, when a transmitting signal Tx at a fundamental frequency fo is inputted to the high-frequency module 101 via the duplexer 103, a harmonic of the transmitting signal Tx is generated at the switch IC 102 or the duplexer 103. In the case where the second-order harmonic with frequency 2fo is generated at the switch IC 102, a second-order harmonic Hm1 with the frequency 2fo is outputted from the antenna connection port PsA1 of the switch IC 102, and a second-order harmonic Hm2 with the frequency 2fo is outputted from the switch port Ps1 of the switch IC 102. The duplexer 103 is set up in such a way that its impedance matches with that of the switch IC 102 at the fundamental frequency fo of the transmitting signal Tx1. Thus, at the frequency 2fo, the matching with the switch IC 102 is not achieved, and the second-order harmonic Hm2 is mostly reflected. The second-order harmonic Hm2 reflected on the duplexer 103 is outputted to the antenna Ant1 together with the second-order harmonic Hm1 via the switch IC 102. Accordingly, the antenna Ant1 for use in transmission transmits the second-order harmonic (Hm1+Hm2) at the frequency 2fo in addition to the transmitting signal Tx at the fundamental frequency fo.

As described above, in the high-frequency module of prior art, the harmonics generated at harmonic sources such as the switch IC and the duplexer travel to the antenna together with the transmitting signal. In the case where a frequency band of the harmonic is used by another communication system, this may pose a problem of lowering reception sensitivity and the like of another communication system. For example, Band 13 of Long Term Evolution (LTE) system has a transmitting signal band from 777 MHz to 787 MHz, and its second-order harmonic band is from 1554 MHz to 1574 MHz. This second-order harmonic band is very close to the band (from 1574.42 MHz to 1576.42 MHz) used for Global Positioning System (GPS). Thus, it is difficult to obtain sufficient attenuation of the second-order harmonic of LTE-Band 13 with a reception filter provided in a GPS receiver. Accordingly, in the case where cellular phones and the like use LTE-Band 13 and include GPS receivers, the second-order harmonic of LTE-Band 13 may reach the GPS receiver and reduce the reception sensitivity of the GPS receiver.

Thus, it is desirable that the harmonic transmitted from the antenna is stable and at a low signal level. However, in some cases, the signal level of the harmonic transmitted from the antenna becomes higher in the high-frequency module of prior art. For example, in the case where a harmonic that directly traveled to the antenna from the source of harmonic such as the switch IC coincides in phase with a harmonic that traveled to the antenna after being reflected at a harmonic reflector that reflects harmonics such as the duplexer, the signal level of the harmonic transmitted from the antenna may become higher due to addition of their signal levels.

Further, in the case where the harmonic source generating harmonics or the harmonic reflector reflecting harmonics is connected as an external circuit, the electrical length of a signal path for a harmonic that travels from the external circuit to the antenna varies depending on the configuration of the external circuit. Thus, the phase of the harmonic that travels from the external circuit to the antenna varies depending on the configuration of the external circuit. On the other hand, the signal path and phase are constant in the harmonic that travels the inside of the high-frequency module and arrives at the antenna. Accordingly, the signal level of the harmonic transmitted from the antenna, namely, the harmonic characteristics of the high-frequency module vary according to the configuration of the external circuit due to the addition of harmonic signals that are different in phase.

SUMMARY OF THE INVENTION

Therefore, preferred embodiments of the present invention provide a high-frequency module and a communication device that reduce a signal level of a harmonic transmitting from an antenna to a low level and have stable harmonic characteristics even in the case where a harmonic source or a harmonic reflector is connected to the high-frequency module as an external circuit.

A high-frequency module according to a preferred embodiment of the present invention includes a switch circuit including an antenna connection port and a plurality of connection switch ports; a first signal path that is connected to one of the plurality of connection switch ports and outputs transmitting signals having a predetermined frequency band to the switch circuit; an external circuit connection portion to which an external circuit is connected, the external circuit connection portion being connected to the first signal path; and a harmonic branch circuit that is provided on the first signal path and allows a harmonic of the transmitting signal to escape to ground.

This configuration allows the harmonic of the transmitting signal, which travels along the first signal path from a source of harmonic or a reflector of harmonic such as the switch circuit or the external circuit, to escape to ground via the harmonic branch circuit. Thus, the harmonic outputted to the switch circuit from the first signal path is suppressed. Accordingly, the signal level of harmonic of the transmitting signal traveled from the switch circuit to an antenna is prevented from becoming higher due to the addition of harmonic signals. This stabilizes the signal level of harmonic transmitted from the antenna at a low level.

In the foregoing high-frequency module, the harmonic branch circuit may be a diplexer including a first filter and a second filter, and may be connected to the first signal path in such a way that a common connection port of the diplexer faces toward the switch circuit. Preferably, in such high-frequency module, the first filter has a passband at an integer multiple of the frequency band of transmitting signals, and the second filter has a passband at the frequency band of transmitting signals. Further, in this high-frequency module, the second filter preferably has a stopband at an integer multiple of the frequency band of transmitting signals.

In the foregoing high-frequency module, the harmonic branch circuit may be a filter provided in parallel to the first signal path and connected to ground, the filter having a passband at an integer multiple of the frequency band of transmitting signals.

The foregoing high-frequency module may further include a source of harmonic generating a harmonic of the transmitting signal or a reflector of harmonic, the source of harmonic being provided on the first signal path and the reflector of harmonic being provided on the first signal path. In such high-frequency module, the source of harmonic or the reflector of harmonic may be a filter circuit connected to the switch circuit via the harmonic branch circuit.

The foregoing high-frequency module may further include a second signal path. The second signal path is connected to one of the plurality of connection switch ports and receives receiving signals from the switch circuit, the receiving signals having a frequency band near an integer multiple of the frequency band of transmitting signals.

In this configuration, the harmonic of the transmitting signal preferably is prevented from reaching the second signal path and being received even in the case where the receiving signals received via the second signal path have a frequency band close to the harmonic of the transmitting signal. Thus, the reception sensitivity for the receiving signal is improved.

A communication device according to a preferred embodiment of the present invention preferably includes the foregoing high-frequency module and a receiver. The receiver receives, from its own antenna, receiving signals having a frequency band near an integer multiple of the frequency band of transmitting signals.

In this configuration, the harmonic of the transmitting signal is prevented from reaching the receiver and being received by the receiver even in the case where the receiver, such as a GPS receiver that is provided in the communication device separately from the high-frequency module, receives the receiving signals having a frequency band close to the foregoing harmonic of the transmitting signal. Thus, the reception sensitivity of the receiver is improved.

According to various preferred embodiments of the present invention, a harmonic of transmitting signals transmitted from the antenna is stabilized at a low signal level by allowing the harmonic of transmitting signals, which travel the signal path, to escape to ground. Accordingly, a decrease in reception sensitivity due to reaching of the harmonic is prevented even in the case where a receiving path or a receiver using a different communication method, whose frequency band is close to the frequency band of the harmonic of transmitting signals, is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First, a high-frequency module and a communication device according to a first preferred embodiment of the present invention are described.

Figure 1:
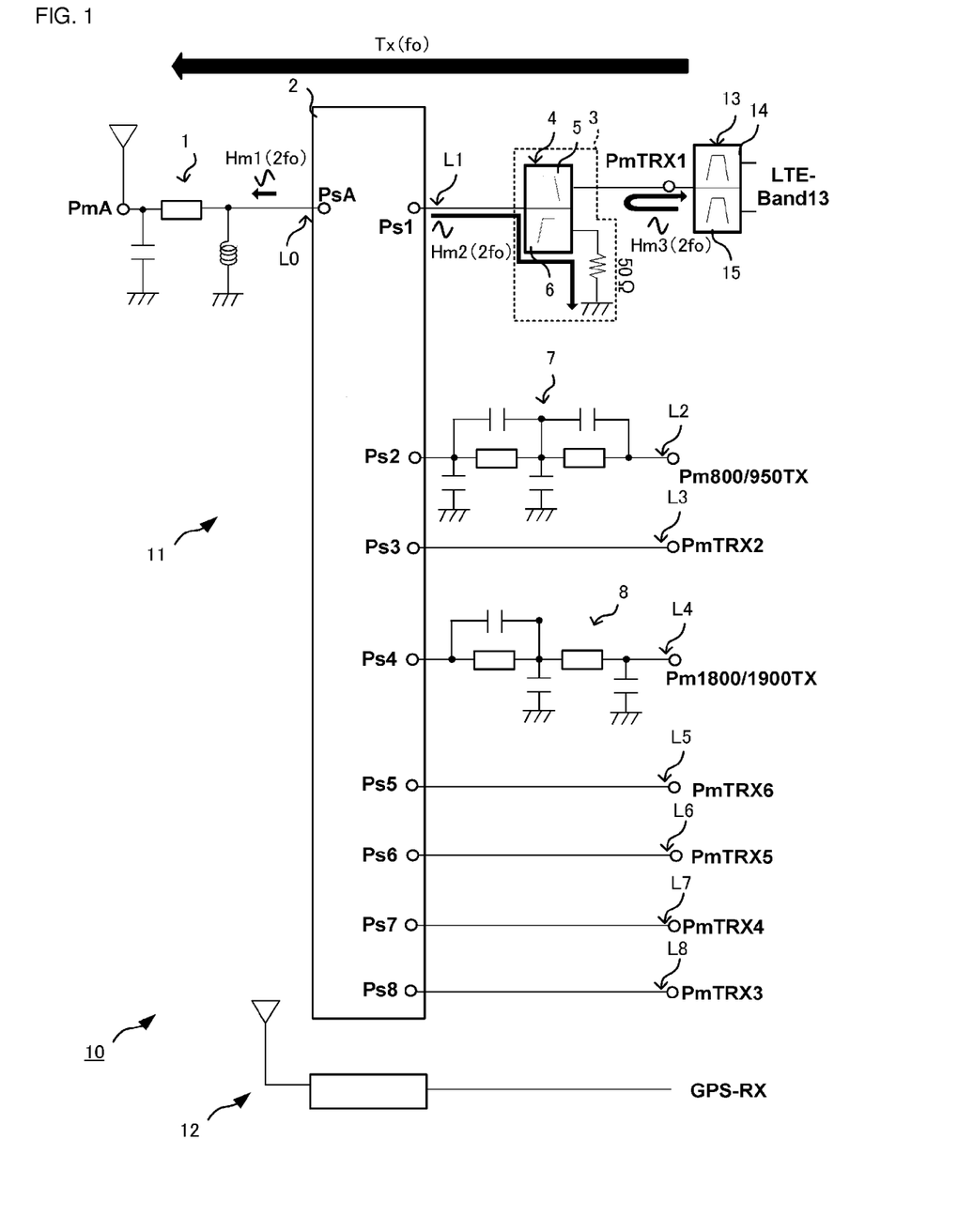
FIG. 1 is a schematic circuit diagram depicting a communication device according to a first preferred embodiment of the present invention.

FIG. 1 is a schematic circuit diagram of a communication device according to the first preferred embodiment.

A communication device 10 depicted in FIG. 1 includes a high-frequency module 11, a GPS receiver 12, a duplexer 13, and a plurality of transceiver circuits that are not illustrated.

The communication device 10 performs wireless communications using a plurality of communication methods. The high-frequency module 11 is connected between a single antenna and a transmitter circuit or a receiver circuit in a subsequent stage, which is not illustrated. The high-frequency module 11 has the capability of transmitting and receiving transmitting signals and receiving signals corresponding to the plurality of communication methods using the single antenna as a common antenna. The GPS receiver 12 includes its own antenna and receives GPS signals between 1574.42 MHz and 1576.42 MHz transmitted from GPS satellites. The GPS receiver 12 is connected to a receiver circuit that processes the GPS signals.

The high-frequency module 11 includes an antenna connection port PmA, module ports PmTRX1, Pm800/950TX, PmTRX2, Pm1800/1900TX, PmTRX3, PmTRX4, PmTRX5, and PmTRX6.

The antenna connection port PmA is connected to the antenna. The module port Pm800/950TX is connected to a transmitter circuit that outputs transmitting signals at 800/950 MHz band. The module port Pm1800/1900TX is connected to a transmitter circuit that outputs transmitting signals at 1800/1900 MHz band. The module ports PmTRX2, PmTRX3, PmTRX4, PmTRX5, and PmTRX6 may or may not be connected to transceiver circuits that process communication signals by communication methods different from the ones described above.

Further, the high-frequency module 11 includes an antenna matching circuit 1, a switch IC 2, a harmonic branch circuit 3, a transmission filter circuit 7, and a transmission filter circuit 8.

The switch IC 2 includes an antenna connection port PsA, switch ports Ps1, Ps2, Ps3, Ps4, Ps5, Ps6, Ps7, and Ps8. The antenna connection port PsA of the switch IC 2 corresponds to an antenna connection port. The respective switch ports Ps1 to Ps8 of the switch IC 2 correspond to connection switch ports. The switch IC 2 has the capability of switching between the switch ports Ps1 to Ps8 and connecting one of the switch ports Ps1 to Ps8 to the antenna connection port PsA.

The antenna connection port PmA of the high-frequency module 11 and the antenna connection port PsA of the switch IC 2 are connected via a signal path L0. The module port PmTRX1 and the switch port Ps1 are connected via a signal path L1. The module port Pm800/950TX and the switch port Ps2 are connected via a signal path L2. The module port PmTRX2 and the switch port Ps3 are connected via a signal path L3. The module port Pm1800/1900TX and the switch port Ps4 are connected via a signal path L4. The module port PmTRX6 and the switch port Ps5 are connected via a signal path L5. The module port PmTRX5 and the switch port Ps6 are connected via a signal path L6. The module port PmTRX4 and the switch port Ps7 are connected via a signal path L7. The module port PmTRX3 and the switch port Ps8 are connected via a signal path L8.

The antenna matching circuit 1 is provided on the signal path L0 and matches impedance between the antenna and the switch IC 2. The transmission filter circuit 7 is provided on the signal path L2, and allows signals within a transmission band of a predetermined communication system to pass. The transmission filter circuit 8 is provided on the signal path L4, and allows signals within a transmission band of a predetermined communication system to pass.

The harmonic branch circuit 3 is provided on the signal path L1, and includes a diplexer 4. The harmonic branch circuit 3 has the capability of allowing a harmonic of the transmitting signal to escape to ground. To achieve this, the diplexer 4 includes a lowpass SAW filter 5 and a highpass SAW filter 6. The lowpass SAW filter 5 and the highpass SAW filter 6 are connected to each other at a common connection port, and are connected to the signal path L1 in such a way that the common connection port faces toward the switch IC 2. Further, the lowpass SAW filter 5 is connected between the common connection port and the module port PmTRX1. The highpass SAW filter 6 is connected to the common connection port as well as ground via a 50Ω termination resistor. In other words, the highpass SAW filter 6 is connected in parallel to the lowpass SAW filter 5 and connected to ground. The lowpass SAW filter 5 corresponds to a second filter. The highpass SAW filter 6 corresponds to a first filter.

The lowpass SAW filter 5 is connected to a common connection port of the duplexer 13 via the module port PmTRX1 located at one end of the signal path L1. The duplexer 13 is an external circuit for the high-frequency module 11. The module port PmTRX1 to which the duplexer 13 is connected corresponds to an external circuit connection portion. Further, the duplexer 13 includes two bandpass SAW filters 14 and 15 that allow transmitting signals and receiving signals of LTE-Band 13 to pass, and is connected to a transceiver circuit of LTE-Band 13.

Here, the highpass SAW filter 6 has a passband at a frequency band higher than the frequency band of transmitting signals of LTE-Band 13. In other words, the highpass SAW filter 6 has the passband at an integer multiple of the frequency band of transmitting signals of LTE-Band 13. On the other hand, the lowpass SAW filter 5 has a passband at the frequency band of transmitting signals of LTE-Band 13, and has a stopband at a frequency band higher than the frequency band of transmitting signals of LTE-Band 13. In other words, the lowpass SAW filter 5 has the stopband at an integer multiple of the frequency band of transmitting signals of LTE-Band 13.

Inputting a transmitting signal of LTE-Band 13, via the duplexer 13, to the high-frequency module 11 having such a circuit configuration described above causes the switch IC 2 or the duplexer 13 to become a harmonic source, and a second-order harmonic or a third-order harmonic of the transmitting signal of LTE-Band 13 is generated.

Here, the transmitting signal of LTE-Band 13 is represented as a transmitting signal Tx at the fundamental frequency fo and denoted by an arrow in FIG. 1. Further, of the second-order harmonic of the transmitting signal of LTE-Band 13 generated at the switch IC 2, a portion outputted from the antenna connection port PsA is represented as a harmonic Hm1 at frequency 2fo and denoted by an arrow in FIG. 1. Further, of the second-order harmonic of the transmitting signal of LTE-Band 13 generated at or reflected on the switch IC 2, a portion outputted from the switch port Ps1 is represented as a harmonic Hm2 at frequency 2fo and denoted by an arrow in FIG. 1. Further, of the second-order harmonic of the transmitting signal of LTE-Band 13 generated at or reflected on the duplexer 13, a portion outputted from the module port PmTRX1 is represented as a harmonic Hm3 at frequency 2fo and denoted by an arrow in FIG. 1.

Of these harmonic signals, the harmonic Hm1 outputted from the antenna connection port PsA of the switch IC 2 is transmitted from the antenna together with the transmitting signal Tx of LTE-Band 13. On the other hand, the harmonic Hm2 outputted from the switch port Ps1 of the switch IC 2 is blocked from passing through the lowpass SAW filter 5, but passes the highpass SAW filter 6 in the diplexer 4 of the harmonic branch circuit 3. The highpass SAW filter 6 is connected to ground via the termination resistor. Thus, the harmonic Hm2 escapes to ground, and reflection of the harmonic Hm2 on the harmonic branch circuit 3 toward the switch IC 2 side is suppressed. Further, the harmonic Hm3 outputted from the duplexer 13 to the module port PmTRX1 is blocked from passing through the lowpass SAW filter 5 in the diplexer 4 of the harmonic branch circuit 3, is reflected back to the duplexer 13 side, and is damped at the duplexer 13.

Accordingly, in this high-frequency module 11, the harmonic inputted to the switch IC 2 from the switch port Ps1 of the switch IC 2 is reduced. This causes no increase in the signal level of the harmonic transmitted from the antenna due to the addition of the harmonic Hm1 and the harmonic Hm2, which occurred in the prior art. Thus, the signal level of harmonic transmitted from the antenna is suppressed.

Further, the harmonic Hm3 from the duplexer 13 is prevented from passing through the harmonic branch circuit 3 and reaching the switch IC 2. Here, the duplexer 13 is an external circuit whose electrical length to the antenna is not constant. Thus, the harmonic that traveled the path whose electrical length is not constant and transmitted from the antenna is reduced, and the signal level of the harmonic outputted from the antenna becomes stable. In other words, the harmonic characteristics in the high-frequency module 11 become stable.

Figure 2:
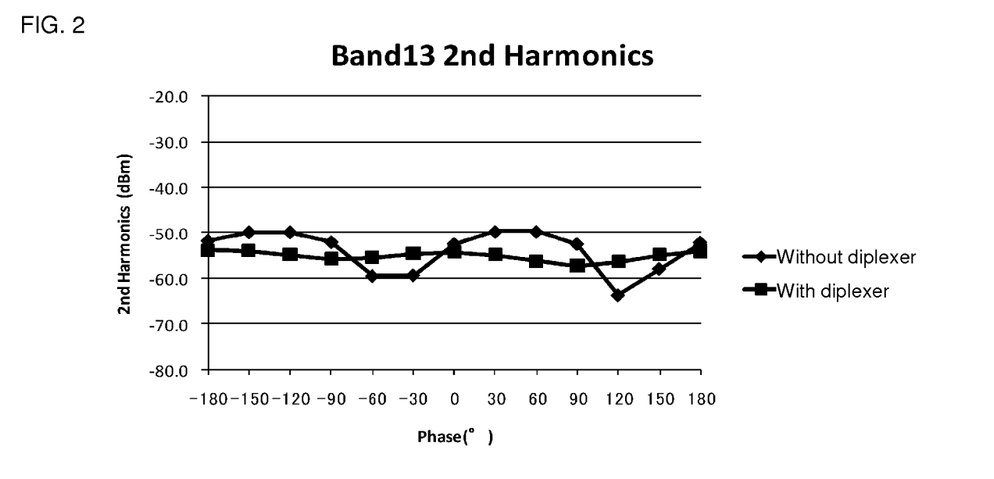
FIG. 2 is a characteristic diagram for describing harmonic characteristics in a high-frequency module according to the first preferred embodiment of the present invention.

FIG. 2 is a diagram depicting a harmonic characteristic of an exemplary preferred embodiment according to the first preferred embodiment and a harmonic characteristic of a comparative example in which the diplexer 4 (harmonic branch circuit 3) is not included. The horizontal axis depicted in the figure corresponds to the electrical length between the switch IC 2 and the duplexer 13, which is an external circuit. Further, the vertical axis depicted in the figure corresponds to the signal level of the second-order harmonic transmitted from the antenna.

In the harmonic characteristic of the exemplary preferred embodiment in which the diplexer 4 is included, the signal level of the second-order harmonic is stabilized in a range of about 55±3 dBm against variation in electrical length to the duplexer 13, which is an external circuit. On the other hand, in the harmonic characteristic of the comparison example in which the diplexer 4 is not included, the signal level of the second-order harmonic varies greatly over a range of about 57±7 dBm in response to variation in electrical length to the duplexer 13, which is an external circuit, due to addition and cancellation of the signal levels of the second-order harmonic signals.

As described above, the high-frequency module 11 according to the first preferred embodiment prevents an increase in the signal level of the harmonic of the transmitting signal of LTE-Band 13 transmitted from the antenna due to the addition, and the harmonic characteristics thereof is stabilized and suppressed. Accordingly, even in the case where the GPS receiver provided in the communication device 10 together with the high-frequency module 11 receives GPS signals in the frequency band (from 1574.42 MHz to 1576.42 MHz) very close to the frequency band (from 1554 MHz to 1574 MHz) of the second-order harmonic of transmitting signals of LTE-Band 13, the second-order harmonic of the transmitting signal of LTE-Band 13 is prevented from reaching and being received by the GPS receiver 12, thus preventing the reception sensitivity of the GPS receiver 12 from degrading.

In the present preferred embodiment, the example is described in which the duplexer 13 is connected to the high-frequency module 11 as an external circuit that serves as a harmonic source or a harmonic reflector. However, the harmonic source or the harmonic reflector is not limited to the duplexer, and may alternatively be any other filter circuit, a transceiver circuit, a power amplifier, and the like.

Alternatively, the harmonic source or the harmonic reflector such as the duplexer 13 may be provided as one of elements of the high-frequency module 11. Even in such a case, the duplexer 13 and a transmitter circuit connected to a post stage of the duplexer 13 may become a harmonic source or a harmonic reflector and cause generation or reflection of the harmonics of the transmitting signal. Thus, providing the harmonic branch circuit allows achieving stabilization and suppression of the harmonic characteristics.

Here, the example is described in which the GPS receiver is used as a receiver to be provided in the communication device together with the high-frequency module. However, the receiver is not limited to the GPS receiver, and may alternatively be any receiver that receives receiving signals of a communication system that has a frequency band close to the harmonic that the harmonic branch circuit allows to escape to ground.

Further, the diplexer provided in the harmonic branch circuit preferably includes the lowpass filter and the highpass filter. Alternatively, this diplexer may include a bandpass filter and the like. Further, the filters are not limited to the SAW filters, and may be any filter circuits having arbitrary configurations.

Next, a high-frequency module according to the second preferred embodiment of present preferred embodiment is described using an example in which an integer multiple of a frequency band of transmitting signals compatible with the high-frequency module is in a frequency band of receiving signals compatible with the high-frequency module.

Figure 3:
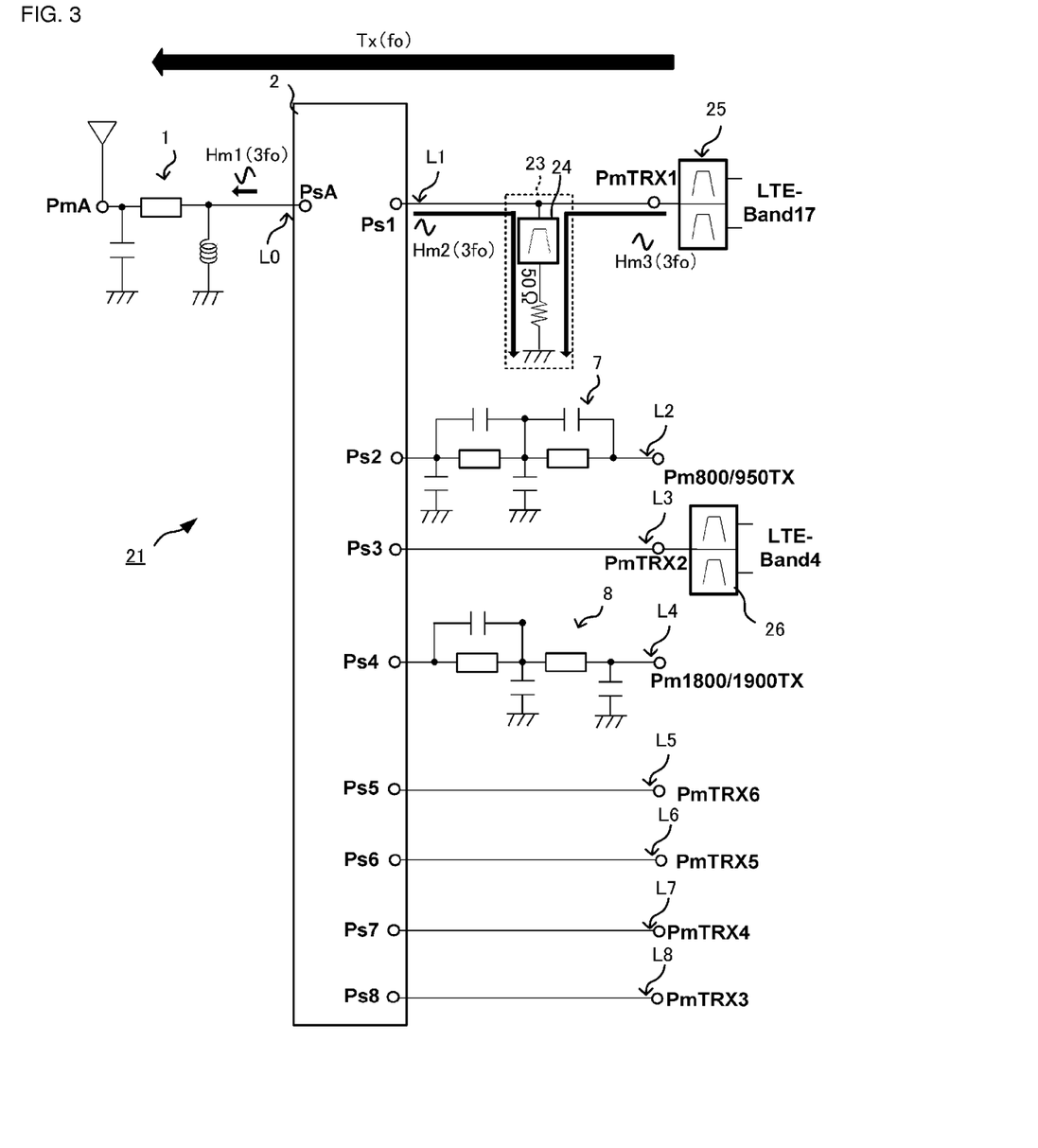
FIG. 3 is a schematic circuit diagram depicting a high-frequency module according to a second preferred embodiment of the present invention.

FIG. 3 is a schematic circuit diagram of a high-frequency module according to the second preferred embodiment of the present invention.

A high-frequency module 21 depicted in FIG. 3 differs from the high-frequency module according to the first preferred embodiment in that a common connection port of a duplexer 25 is connected to the module port PmTRX1, the duplexer 25 includes two bandpass SAW filters that allows transmitting signals and receiving signals of LTE-Band 17 to pass, and the duplexer 25 is connected to a transceiver circuit of LTE-Band 17.

Further, the high-frequency module according to the second preferred embodiment also differs from the high-frequency module according to the first preferred embodiment in that a common connection port of a duplexer 26 is connected to the module port PmTRX2. The duplexer 26 includes two bandpass SAW filters that allows transmitting signals and receiving signals of LTE-Band 4 to pass, and is connected to a transceiver circuit of LTE-Band 4.

Here, a frequency band of the third-order harmonic of transmitting signals of LTE-Band 17 is close to a frequency band of receiving signals of LTE-Band 4. Accordingly, even in such a case, providing the harmonic branch circuit on the signal wiring L1, through which a transmitting signal of LTE-Band 17 travels, allows to suppress a flow of the third-order harmonic of the transmitting signal of LTE-Band 17 to the switch IC 2 from the signal wiring L1. This prevents the third-order harmonic from causing a signal level increase or destabilization when the third-order harmonic reaches a receiver circuit of LTE-Band 4. This prevents the reception sensitivity of LTE-Band 4 from degrading.

Further, the high-frequency module 21 includes a harmonic branch circuit 23 instead of the harmonic branch circuit 3 described in the first preferred embodiment. The harmonic branch circuit 23 is provided on the signal path L1 and includes a bandpass SAW filter 24. The harmonic branch circuit also has the capability of allowing the harmonic of the transmitting signal to escape to ground. To achieve this, the bandpass SAW filter 24 has a passband corresponding to the harmonic of the transmitting signal. The bandpass SAW filter 24 is connected in parallel to the signal path L1 and connected to ground via a 50Ω termination resistor.

In such circuit configuration, inputting a transmitting signal of LTE-Band 17 via the duplexer 25 causes the switch IC 2 or the duplexer 25 to become a harmonic source, and a second-order harmonic or a third-order harmonic of the transmitting signal of LTE-Band 17 is generated.

Here, the transmitting signal of LTE-Band 17 is represented as a transmitting signal Tx at the fundamental frequency fo and denoted by an arrow in FIG. 3. Further, of the third-order harmonic of the transmitting signal of LTE-Band 17 generated at or reflected on the switch IC 2, a portion outputted from the antenna connection port PsA is represented as a harmonic Hm1 at frequency 3fo and denoted by an arrow in FIG. 3. Further, of the third-order harmonic of the transmitting signal of LTE-Band 17 generated at the switch IC 2, a portion outputted from the switch port Ps1 is represented as a harmonic Hm2 at frequency 3fo and denoted by an arrow in FIG. 3. Further, of the third-order harmonic of the transmitting signal of LTE-Band 17 generated at or reflected on the duplexer 25, a portion outputted from the module port PmTRX1 is represented as a harmonic Hm3 at frequency 3fo and denoted by an arrow in FIG. 1.

Also in this case, the harmonic Hm1 outputted from the antenna connection port PsA of the switch IC 2 is transmitted from the antenna together with the transmitting signal Tx of LTE-Band 17. On the other hand, the harmonic Hm2 outputted from the switch port Ps1 of the switch IC 2 passes through the bandpass SAW filter 24 of the harmonic branch circuit 23 and is allowed to escape to ground via the termination resistor, thus suppressing reflection on the harmonic branch circuit 23 toward the switch IC 2 side. Further, the harmonic Hm3 outputted to the module port PmTRX1 from the duplexer 25 passes through the bandpass SAW filter 24 of the harmonic branch circuit 23 and is allowed to escape to ground via the termination resistor, thus suppressing passage through the harmonic branch circuit 23 toward the switch IC 2 side.

Accordingly, the harmonic inputted to the switch IC 2 from the switch port Ps1 of the switch IC 2 is reduced. This makes it possible to suppress the signal level of the harmonic outputted from the switch IC 2. Further, this prevents the harmonic Hm3 outputted from the duplexer 25, which is an external circuit and whose electrical length to the switch IC 2 is not constant, from reaching the switch IC 2, thus stabilizing the harmonic characteristics of the high-frequency module 21.

In the present preferred embodiment, the harmonic branch circuit including the bandpass SAW filter is described as an example of the configuration of the harmonic branch circuit. Alternatively, in the present preferred embodiment, the harmonic branch circuit may be configured to include the diplexer as is described in the first preferred embodiment. Conversely, the configuration of the harmonic branch circuit described in the present preferred embodiment may be used in the first preferred embodiment.

Further, in the present preferred embodiment, the SAW filter included in the harmonic branch circuit preferably is a bandpass type. However, the SAW filter to be included in the harmonic branch circuit is not limited thereto, and another type of SAW filter may be used as long as the SAW filter blocks passing of the transmitting signal at the fundamental frequency and allows the harmonic thereof to pass. Further, a filter circuit having a configuration different from that of the SAW filter may also be used.

Next, a high-frequency module according to the third preferred embodiment of present preferred embodiment is described using an example whose circuit configuration allows using carrier aggregation that aggregates a plurality of bands of LTE communication system for use.

Figure 4:
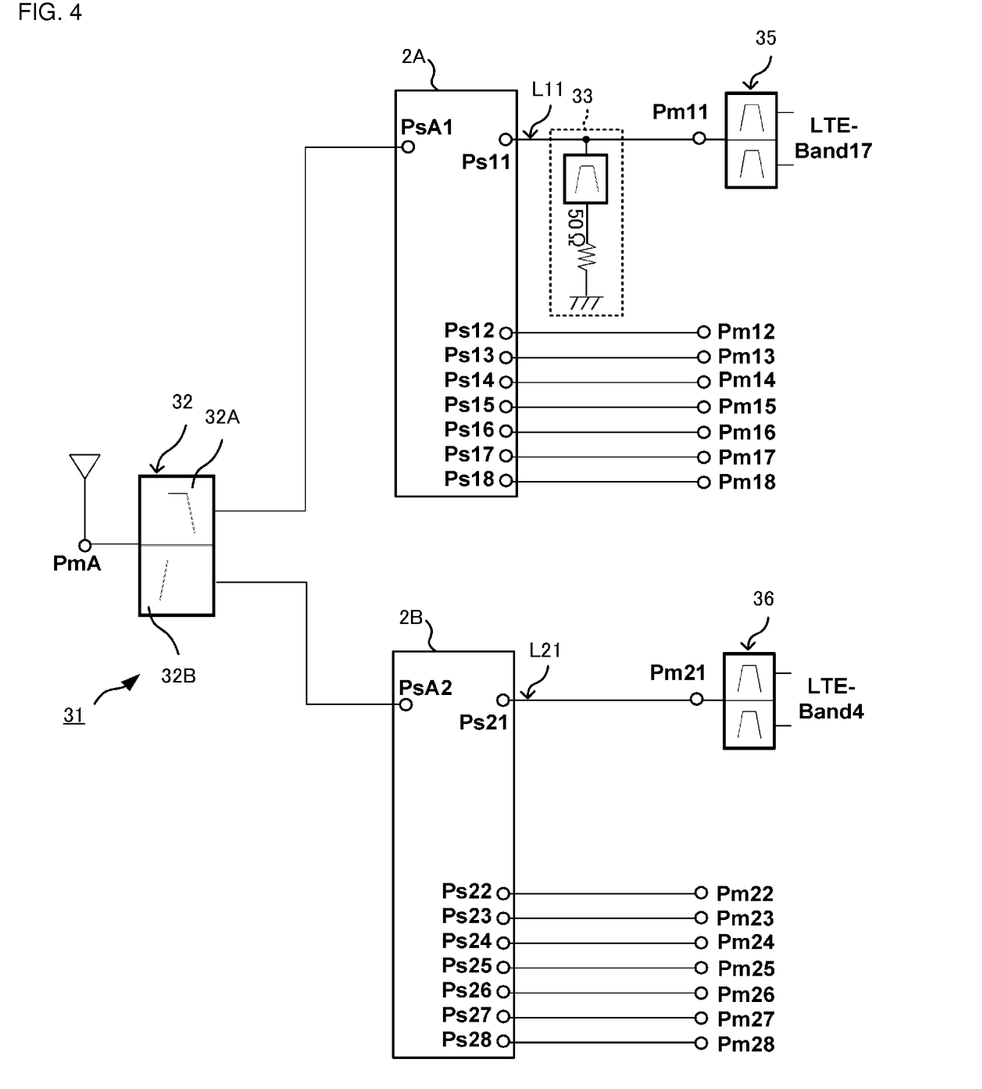
FIG. 4 is a schematic circuit diagram depicting a high-frequency module according to a third preferred embodiment of the present invention.

FIG. 4 is a schematic circuit diagram of a high-frequency module according to the third preferred embodiment of the present invention.

A high-frequency module 31 depicted in FIG. 4 includes an antenna connection port PmA, module ports Pm11, Pm12, Pm13, Pm14, Pm15, Pm16, Pm17, Pm18, Pm21, Pm22, Pm23, Pm24, Pm25, Pm26, Pm27, and Pm28.

The antenna connection port PmA is connected to an antenna. The module port Pm11 is connected to a common connection port of a duplexer 35. Further, the duplexer 35 includes two bandpass SAW filters that allow transmitting signals and receiving signals of LTE-Band 17 to pass and is connected to a transceiver circuit of LTE-Band 17. The module port Pm21 is connected to a common connection port of a duplexer 36. The duplexer 36 includes two bandpass SAW filters that allow transmitting signals and receiving signals of LTE-Band 4 to pass and is connected to a transceiver circuit of LTE-Band 4. Other module ports Pm12, Pm13, Pm14, Pm15, Pm16, Pm17, Pm18, Pm22, Pm23, Pm24, Pm25, Pm26, Pm27, and Pm28 may or may not be connected to transceiver circuits that process communication signals by communication methods different from the ones described above.

Further, the high-frequency module 31 includes a diplexer 32, two switch ICs 2A and 2B, and a harmonic branch circuit 33.

The diplexer 32 includes a lowpass SAW filter 32A and a highpass SAW filter 32B. The lowpass SAW filter 32A and the highpass SAW filter 32B are connected to each other at a common connection port. The diplexer 32 is connected to the antenna connection port PmA at the common connection port. The passband of the lowpass SAW filter 32A includes at least the band of LTE-Band 17, and the stopband thereof includes at least the band of LTE-Band 4. The stopband of the highpass SAW filter 32B includes at least the band of LTE-Band 17, and the passband thereof includes at least the band of LTE-Band 4.

The switch IC 2A includes an antenna connection port PsA1, switch ports Ps11, Ps12, Ps13, Ps14, Ps15, Ps16, Ps17, and Ps18. The antenna connection port PsA1 of the switch IC 2A corresponds to the antenna connection port in the claims, and is connected to the antenna connection port PmA with the lowpass SAW filter 32A of the diplexer 32 interposed therebetween. Further, the switch ports Ps11 to Ps18 of the switch IC 2A each correspond to the connection switch port in the claims, and are respectively connected to the module ports Pm11 to Pm18. This switch IC 2A has the capability of switching between the switch ports Ps11 to Ps18 and connecting one of the switch ports Ps11 to Ps18 to the antenna connection port PsA1.

The switch IC 2B includes an antenna connection port PsA2, switch ports Ps21, Ps22, Ps23, Ps24, Ps25, Ps26, Ps27, and Ps28. The antenna connection port PsA2 of the switch IC 2B corresponds to the antenna connection port in the claims, and is connected to the antenna connection port PmA with the highpass SAW filter 32B of the diplexer 32 interposed therebetween. Further, the switch ports Ps21 to Ps28 of the switch IC 2B each correspond to the connection switch port, and are respectively connected to the module ports Pm21 to Pm28. The switch IC 2B has the capability of switching between the switch ports Ps21 to Ps28 and connecting one of the switch ports Ps21 to Ps28 to the antenna connection port PsA2.

The harmonic branch circuit 33 is provided on a signal path L11 located between the switch port Ps11 of the switch IC 2A and the module port Pm11 of the high-frequency module 31. The harmonic branch circuit 33 is identical to the harmonic branch circuit 23 described in the second preferred embodiment, and has the capability of allowing the harmonic of the transmitting signal to escape to ground.

Even in the circuit configuration according to the third preferred embodiment, inputting a transmitting signal of LTE-Band 17, via the duplexer 35, causes the switch IC 2A or the duplexer 35 to become a harmonic source, and a second-order harmonic or a third-order harmonic of the transmitting signal of LTE-Band 17 is generated. A frequency band of the third-order harmonic of transmitting signals of LTE-Band 17 is close to a frequency band of receiving signals of LTE-Band 4, as described in the second preferred embodiment.

Accordingly, also in this case, providing the harmonic branch circuit 33 on the signal wiring L11, through which a transmitting signal of LTE-Band 17 travels, makes it possible to suppress a flow of the third-order harmonic of the transmitting signal of LTE-Band 17 to the switch IC 2A from the signal wiring L11. This prevents the third-order harmonic from reaching a receiver circuit of LTE-Band 4 via the diplexer 32 and the switch IC 2B and causing an increase or destabilization of the signal level. Accordingly, the reception sensitivity of LTE-Band is prevented from degrading. Further, this prevents the harmonic of the transmitting signal of LTE-Band 17 from causing an increase or destabilization in the signal level when transmitted from the antenna via the diplexer 32.

In the present preferred embodiment, the harmonic branch circuit including the bandpass SAW filter is described as an example of the configuration of the harmonic branch circuit. Alternatively, in the present preferred embodiment, the harmonic branch circuit may be configured so as to include the diplexer as is described in the first preferred embodiment.

Further, in the present preferred embodiment, the SAW filter included in the harmonic branch circuit preferably is a bandpass type. However, the SAW filter to be included in the harmonic branch circuit is not limited thereto, and another type of SAW filter may be used as long as the SAW filter blocks passing of the transmitting signal at the fundamental frequency and allows the harmonic thereof to pass. Further, a filter circuit having a configuration different from that of the SAW filter may also be used.

Further, in the first to third preferred embodiments, the examples are described assuming that the termination resistor included in the harmonic branch circuit preferably is about 50Ω, for example. However, the termination resistor is not limited to about 50Ω. Further, the termination resistor may alternatively be provided as an external circuit connected to the high-frequency module.

Further, in the first to third preferred embodiments, the examples are described in which the duplexer preferably is connected to the module port and the module port preferably is connected to the harmonic branch circuit. However, any circuit may be connected to the module port as long as it has a configuration that may become a harmonic source or a harmonic reflector.

Further, in the first to third preferred embodiments, the examples are described in which the switch IC preferably is used as a switch circuit. Alternatively, as the switch circuit, a diode switch may be provided on a multilayer board. Further, the examples are described in which the diplexer is preferably is used as the filter circuit. Alternatively, a single SAW filter or a filter including a passive element may be provided as the filter circuit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency module comprising:
a switch circuit including an antenna connection port and a plurality of connection switch ports;
a first signal path that is connected to one of the plurality of connection switch ports and outputs to the switch circuit transmitting signals having a predetermined frequency band;
an external circuit connection portion to which an external circuit is connected, the external circuit connection portion being connected to the first signal path; and
a harmonic branch circuit that is provided on the first signal path and allows a harmonic of the transmitting signal to escape to ground; wherein
the harmonic branch circuit is a diplexer including a first filter connected between a common connection port and ground and a second filter connected between the common connection port and the external circuit connection portion, the harmonic branch circuit being connected to the first signal path such that the common connection port faces toward the switch circuit.

2. The high-frequency module according to claim 1, wherein
the first filter has a passband at an integer multiple of the frequency band of transmitting signals; and
the second filter has a passband at the frequency band of transmitting signals.

3. The high-frequency module according to claim 2, wherein the second filter has a stopband at an integer multiple of the frequency band of transmitting signals.

4. The high-frequency module according to claim 3, further comprising:
a source of harmonic or a reflector of harmonic, the source of harmonic being provided on the first signal path and generating a harmonic of the transmitting signal, the reflector of harmonic being provided on the first signal path and reflecting a harmonic.

5. The high-frequency module according to claim 4, wherein the source of harmonic or the reflector of harmonic is a filter circuit connected to the switch circuit via the harmonic branch circuit.

6. The high-frequency module according to claim 3, further comprising:
a second signal path that is connected to one of the plurality of connection switch ports and receives input of receiving signals from the switch circuit, the receiving signals having a frequency band near an integer multiple of the frequency band of transmitting signals.

7. A communication device comprising:
the high-frequency module according to claim 3; and
a receiver that receives, from an antenna in the receiver, receiving signals having a frequency band near an integer multiple of the frequency band of transmitting signals.

8. The high-frequency module according to claim 3, wherein the harmonic branch circuit includes a termination resistor.

9. The high-frequency module according to claim 2, further comprising:
a source of harmonic or a reflector of harmonic, the source of harmonic being provided on the first signal path and generating a harmonic of the transmitting signal, the reflector of harmonic being provided on the first signal path and reflecting a harmonic.

10. The high-frequency module according to claim 9, wherein the source of harmonic or the reflector of harmonic is a filter circuit connected to the switch circuit via the harmonic branch circuit.

11. The high-frequency module according to claim 2, further comprising:
a second signal path that is connected to one of the plurality of connection switch ports and receives input of receiving signals from the switch circuit, the receiving signals having a frequency band near an integer multiple of the frequency band of transmitting signals.

12. A communication device comprising:
the high-frequency module according to claim 2; and
a receiver that receives, from an antenna in the receiver, receiving signals having a frequency band near an integer multiple of the frequency band of transmitting signals.

13. The high-frequency module according to claim 2, wherein the harmonic branch circuit includes a termination resistor.

14. The high-frequency module according to claim 1, further comprising:
a source of harmonic or a reflector of harmonic, the source of harmonic being provided on the first signal path and generating a harmonic of the transmitting signal, the reflector of harmonic being provided on the first signal path and reflecting a harmonic.

15. The high-frequency module according to claim 14, wherein the source of harmonic or the reflector of harmonic is a filter circuit connected to the switch circuit via the harmonic branch circuit.

16. The high-frequency module according to claim 14, further comprising:
a second signal path that is connected to one of the plurality of connection switch ports and receives input of receiving signals from the switch circuit, the receiving signals having a frequency band near an integer multiple of the frequency band of transmitting signals.

17. A communication device comprising:
the high-frequency module according to claim 14; and
a receiver that receives, from an antenna in the receiver, receiving signals having a frequency band near an integer multiple of the frequency band of transmitting signals.

18. The high-frequency module according to claim 1, further comprising:
a second signal path that is connected to one of the plurality of connection switch ports and receives input of receiving signals from the switch circuit, the receiving signals having a frequency band near an integer multiple of the frequency band of transmitting signals.

19. A communication device comprising:
the high-frequency module according to claim 1; and
a receiver that receives, from an antenna in the receiver, receiving signals having a frequency band near an integer multiple of the frequency band of transmitting signals.

20. The high-frequency module according to claim 1, wherein the harmonic branch circuit includes a termination resistor.

* * * * *